(12) United States Patent
Toner

(10) Patent No.: US 10,648,843 B2
(45) Date of Patent: May 12, 2020

(54) TEMPORAL BASED MEASUREMENT SYSTEM PROVIDING REAL TIME TRACKING

(71) Applicant: Christopher M Toner, Germantown, MD (US)

(72) Inventor: Christopher M Toner, Germantown, MD (US)

( * ) Notice: Subject to any disclaimer, the term of this patent is extended or adjusted under 35 U.S.C. 154(b) by 126 days.

(21) Appl. No.: 15/713,599

(22) Filed: Sep. 22, 2017

(65) Prior Publication Data

US 2018/0100751 A1 Apr. 12, 2018

Related U.S. Application Data

(60) Provisional application No. 62/398,621, filed on Sep. 23, 2016.

(51) Int. Cl.
| | |
|---|---|
| *G01F 3/00* | (2006.01) |
| *G01F 13/00* | (2006.01) |
| *G01M 3/02* | (2006.01) |
| *B67D 1/08* | (2006.01) |
| *B67D 1/04* | (2006.01) |

(52) U.S. Cl.
CPC ......... *G01F 13/008* (2013.01); *B67D 1/0406* (2013.01); *B67D 1/0881* (2013.01); *B67D 1/0888* (2013.01); *G01F 3/00* (2013.01); *G01F 13/006* (2013.01); *G01M 3/02* (2013.01);

(Continued)

(58) Field of Classification Search
CPC ........ G01F 13/008; G01F 13/006; G01F 3/00; B67D 1/0888; B67D 1/0881; B67D 2210/00091
See application file for complete search history.

(56) References Cited

U.S. PATENT DOCUMENTS

| | | | |
|---|---|---|---|
| 645,762 | A | 3/1900 | Sundh |
| 3,170,597 | A | 2/1965 | Reichenberger |

(Continued)

FOREIGN PATENT DOCUMENTS

| | | | |
|---|---|---|---|
| WO | 2002072468 | 9/2002 | |
| WO | WO-02072468 A2 * | 9/2002 | ............... B67D 1/00 |

OTHER PUBLICATIONS

WO 02/072468 A2, Sep. 19, 2002, 39 pp. (Year: 2002).*

*Primary Examiner* — Toan M Le
(74) *Attorney, Agent, or Firm* — McLean Law LLC; Kimberly McLean, Esq.

(57) ABSTRACT

A measurement system for providing real-time tracking. The measurement system includes a system tracking measurement unit, a system tracking processing unit, and a user interface device for receiving data corresponding to one or more system conditions over an electronic communications channel, the user interface device including a display. The system tracking measurement unit calculates temporal flow data when the orientation of one or more objects corresponds to an event trigger value and transmits the data to the system tracking processing unit. The system tracking processing unit determines one or more tracking parameters based on the temporal flow data. In addition, the system tracking processing unit determines one or more system conditions based on the one or more tracking parameters. The system tracking processing unit transmits data corresponding to the system conditions for display on a user interface device.

25 Claims, 2 Drawing Sheets

(52) U.S. Cl.
CPC .............. *B67D 2210/00089* (2013.01); *B67D 2210/00091* (2013.01)

(56) References Cited

U.S. PATENT DOCUMENTS

| | | |
|---|---|---|
| 3,993,218 A | 11/1976 | Reichenberger |
| RE31,434 E | 11/1983 | Reilly |
| 4,436,223 A | 3/1984 | Wilson |
| 5,255,819 A | 10/1993 | Peckels |
| 6,036,055 A | 3/2000 | Mogadam |
| 6,409,046 B1 | 6/2002 | Peckels |
| 6,892,166 B2 | 5/2005 | Mogadam |
| 7,003,406 B2 | 2/2006 | Mogadam |
| 7,088,258 B2 | 8/2006 | Morrison |
| 7,182,110 B2 | 2/2007 | Roebuck |
| 7,190,278 B2 | 3/2007 | Morrison |
| 7,598,883 B2 | 10/2009 | Morrison |
| 7,742,883 B2 | 6/2010 | Dayton |
| 8,925,383 B2 | 1/2015 | Beal |
| 9,302,826 B2 | 4/2016 | Brower |
| 2003/0055589 A1* | 3/2003 | Mogadam ................ B67D 1/00 702/100 |
| 2005/0194402 A1 | 9/2005 | Morrison |
| 2011/0166699 A1 | 7/2011 | Palmquist |
| 2015/0344284 A1 | 12/2015 | Perkins |

\* cited by examiner

TEMPORAL BASED MEASUREMENT SYSTEM PROVIDING REAL TIME TRACKING

CROSS-REFERENCE TO RELATED APPLICATION

This application claims the benefit of priority of U.S. Provisional Application No. 62/398,621 filed on Sep. 23, 2016, the disclosure of which is incorporated herein by reference in its entirety.

FIELD OF THE INVENTION

Embodiments described herein generally relate to tracking systems, and more particularly to providing real time tracking with a temporal based measurement system.

BACKGROUND OF THE INVENTION

Real time tracking is very important in beer distribution systems. Loss due to spillage, foam (keg change), inefficient inventory, waste, down time, improper $CO_2/N$ (Carbon Dioxide/Nitrogen or other similar drive or mixture components) settings, clean glass and bartender abuse/over pour can cost a bar significant losses per month. Thus, there is a need in the art for an accurate and efficient real time tracking system.

BRIEF DESCRIPTION OF THE DRAWINGS

The various advantages of the embodiments of the present disclosure will become apparent to one skilled in the art by reading the following specification and appended claims, and by referencing the following drawings, in which:

SUMMARY OF THE INVENTION

Figure 1:
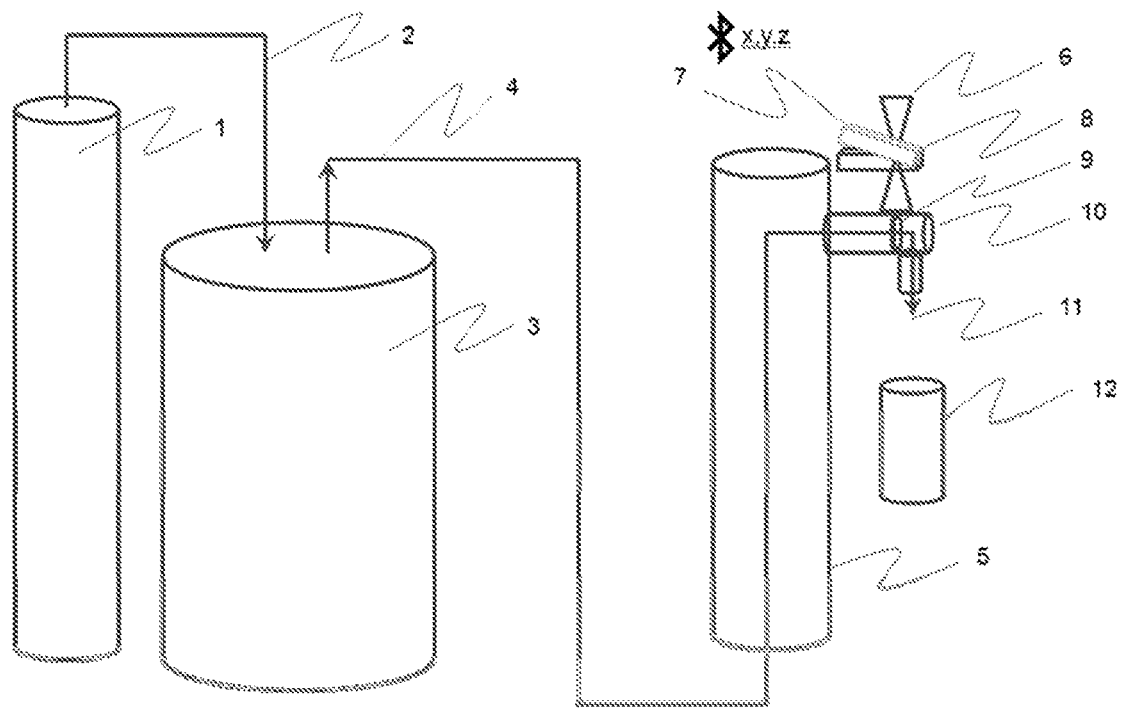
FIG. 1 shows an exemplary measurement system for providing real time tracking configured to operate according to an embodiment of the present disclosure.

Exemplary embodiments disclosed herein describe a measurement system for providing real-time tracking. The measurement system includes a system tracking measurement unit, a system tracking processing unit, and a user interface device for receiving data corresponding to one or more system conditions over an electronic communications channel for real-time notification to a user of the one or more system conditions, the user interface device including a display.

The system tracking measurement unit (STMU) includes one or more orientation detectors for detecting the orientation of one or more objects based on three-dimensional (3D) space positioning of the one or more objects, a timing unit for calculating temporal flow data based on the detected orientation of the one or more objects and an electronic communications channel for transmitting the temporal flow data to system tracking processing unit.

The system tracking processing (STPU) unit includes a first electronic communications channel for receiving temporal flow data from the STMU, a second electronic communications channel for transmitting data corresponding to one or more system conditions for display on user interface device, a microprocessor, a memory storage area, a database stored in the memory storage area for storing a first set of evaluation rules, wherein the first set of evaluation rules corresponds to one or more tracking parameters, and a second set of evaluation rules, wherein the second set of evaluation rules corresponds to one or more system conditions.

In addition, the STPU includes a tracking processing module, in the memory storage area, having program instructions that, when executed by the microprocessor, causes the microprocessor to determine one or more tracking parameters using temporal flow data and a first set of evaluation rules, and determine one or more system conditions of a liquid or gas distribution source using one or more tracking parameters and a second set of evaluation rules.

In some exemplary embodiments, the STMU includes one or more sensors for determining a three-dimensional (3D) space position of one or more objects In some exemplary embodiments, the timing unit commences calculating temporal flow data when a detected orientation of one or more objects corresponds to an event trigger value.

In some exemplary embodiments, the temporal flow data includes at least one of a time duration of one or more object's on and off position or time duration of an event start/stop.

In some exemplary embodiments, one or more tracking parameters include one of i) liquid, granular bulk solid or gas flow rate or ii) liquid or gas volume.

In some exemplary embodiments, the liquid flow rate is determined based on temporal flow data, a drive pressure force, and a known or calculated orifice size.

In some exemplary embodiments, the one or more tracking parameters are determined independent of a size of a liquid or gas distribution source or a liquid or gas receiving object.

In some exemplary embodiments, the system tracking measurement unit (STMU) is not located in the flow of liquid or gas being distributed from a liquid or gas distribution source.

In some exemplary embodiments, the operation of the STMU is independent of any internal flow of the liquid or gas being distributed from a liquid or gas distribution source.

In some exemplary embodiments, one or more system conditions include at least one or more from the group consisting of i) the number of servings left before a distribution source is empty, ii) status of distribution source percent full, and iii) originally delivered distribution source volume once the distribution source is emptied.

In some exemplary embodiments, the measurement system includes a detector for determining tampering and non-normal conditions.

In some exemplary embodiments, the measurement system includes a digital IOT (Internet of Things) gas pressure transducer monitoring, a digital/ultrasonic IOT (Internet of Things) foam detection device sensor, digital IOT (Internet of Things) valve solenoid switchover, and an IOT (Internet of Things) non-invasive liquid drain detector.

In some exemplary embodiments, the STMU is adapted to attach to a standard tap handle in a liquid or gas distribution system.

In some exemplary embodiments, the STMU is adapted to mount to a standard beer tap handle in a keg beer distribution system.

In some exemplary embodiments, the location of the attachment of the STMU to the tap handle is independent of its last know position.

In some exemplary embodiments, one or more objects include a tap handle in a liquid or gas distribution system.

In some exemplary embodiments, the measurement system is adapted to provide information to mobile phones, tablet computers, desktop computers, monitoring centers or a cloud network.

Exemplary embodiments disclosed herein describe a system tracking measurement unit (STMU). The STMU includes one or more sensors for determining a three-dimensional (3D) space position of one or more objects, one or more orientation detectors for detecting the orientation of one or more objects based on the determined three-dimensional (3D) space position, a timing unit for determining temporal flow data based on the detected orientation of the one or more objects, wherein the timing unit commences calculating the temporal flow data when the detected orientation of the one or more objects corresponds to an event trigger value, and an electronic communications channel for transmitting the temporal flow data to a processing unit.

In some exemplary embodiments, the STMU includes a status indicator, wherein the status indicator provides notification of poor status, distribution container status or system trouble.

In some exemplary embodiments, the STMU includes a self-contained battery, wherein the battery allows the system to continue detecting, collecting and buffering a number of events during a power loss.

In some exemplary embodiments, the STMU is adapted to operate with a Digital IOT (Internet of Things) Gas Pressure Transducer Monitoring, a Digital/Ultrasonic IOT (Internet of Things) Foam Detection Device Sensor, Digital IOT (Internet of Things) Valve Solenoid Switchover, and an IOT (Internet of Things) non-invasive Liquid Drain Detector.

In some exemplary embodiments, the STMU is adapted to operate with a liquid or gas distribution system with distribution lines, including a distribution system with long distances of distribution lines.

In some exemplary embodiments, the STMU is adapted to remain fully operational when an inadvertent evacuation of liquid or gas within the distribution lines occurs.

In some exemplary embodiments, the temporal flow data is the time duration of one or more object's on and off position orientation or the time duration of an event start/stop.

DETAILED DESCRIPTION

FIG. 1 shows an example of a measurement system for providing real time tracking ("the measurement system"). Although some of the exemplary embodiments described herein are tailored to a beer distribution system environment, the present disclosed systems and methods are not limited to a beer distribution system, and can be used in other system environments, such as, for example, soda/juice carbonated/non-carbonated drinks, corrosive chemicals, petroleum, hopper grain, loose candy, medical/pharmaceutical supplies or bulk product, coffee, alcoholic based or mixed drinks systems or gas distribution systems or any distribution system that is based upon a handle that changes position during distribution of product.

As illustrated in FIG. 1, the system includes gas or distribution pressure/force 1 (e.g., Carbon Dioxide $CO_2$), gas/pressure distribution lines 2, liquid or gas distribution source 3 (e.g., a beer keg), mixed product and gas distribution line 4, valve structure 5, tap distribution handle 6, system tracking measurement unit ("STMU") 8, orifice allowing product to distribute 9, product distribution valve 10 (e.g., faucet), resulting product flow 11 (e.g., pouring of liquid) and product receiving object 12 (e.g., glass/cup). Additionally, the system includes system tracking processing unit (STPU) (shown in FIG. 2, See reference 21), user interface device (shown in FIG. 2, See reference 20), and an electronic communication channel for transmitting data to the user interface device.

The STMU 8 includes one or more orientation detectors for detecting the orientation of one or more objects, one or more sensors for determining three-dimensional (3D) space positioning, a timing unit, a visual status indicator and an electronic communication channel. The one or more orientation detectors may include a microcircuit, such as, for example, a system on a chip (SOC) programmed to perform orientation detection. The one or more sensors may include a fused sensor, such as, for example, a magnetometer, gyroscope and accelerometer fused sensor capable of determining three-dimensional (3D) space positioning. The timing unit may include a microcircuit, such as, for example, a system on a chip (SOC) programmed to perform timing calculations. The electronic communication channel may include a wireless communication channel, such as, for example, Bluetooth®, Bluetooth Low Energy®, Zigbee®, LoWPAN®, Sub-1 GHz® or other common low power wireless connectivity. The visual status indicator may include a light emitting diode (LED), which provides notification of poor status, keg status or system trouble. In an alternate embodiment, the STMU may include an audible status indicator or graphical user display.

The STPU includes a first electronic communications channel for receiving data, a microprocessor, a memory storage area and a second electronic communications channel for transmitting data for display on the user interface device. The electronic communication channels may include, a wireless local area network (WLAN), Bluetooth technology, dedicated short range communication technology (dsrc), Personal Area Network (PAN), global positioning system and radio frequency (RF) links.

The memory storage area includes one or more databases and one or more processing modules. The one or more databases store information, such as, for example, a first set of evaluation rules corresponding to tracking parameters and a second set of evaluations corresponding to system conditions. The evaluations rules may include information/data such as, for example, algorithms, formulas or mathematical equations.

The one or more processing modules may include a tracking processing module, having program instructions that, when executed by the microprocessor, causes the microprocessor to determine one or more tracking parameters based on temporal flow data and to determine one or more system conditions based on one or more tracking parameters.

In addition, the system processing tracking unit (STPU) 21 may include a plurality of computers or servers located in many different geographic locations connected via a network system. The network system may comprise, for example, a wide area network (WAN), a local area network (LAN) or the Internet. The network system provides communication among devices using one or more communications protocols.

The system tracking processing unit (STPU) is adapted to provide data/information to mobile phones, smart mobile phones, tablet computers, desktop computers, monitoring centers, a cloud network or any common Internet browsers.

Figure 2:
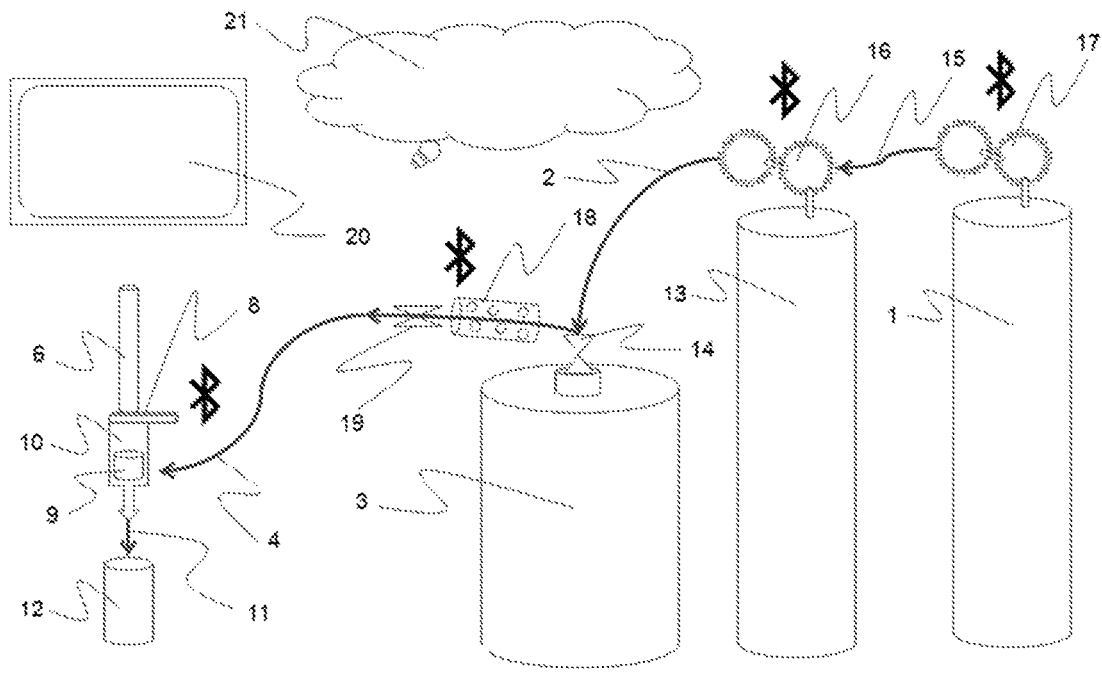
FIG. 2 shows an exemplary measurement system configured to operate in another embodiment of the present disclosure.

User interface device includes a controller and data storage device (not shown). The controller can include one or more microprocessors, computer readable memory (e.g., read-only memory (ROM), random access memory (RAM), mechanisms and structures for performing I/O operations. The controller can execute an operating system for execution on the central processing unit and one or more application programs to control the operation of the user interface devices. The data storage device stores one or more databases, the operating system and one or more application programs. User interface device may include for example, mobile phones, smart mobile phones, tablet computers and desktop computers FIG. 2 illustrates another exemplary embodiment of the measurement system for providing real-time tracking. The system includes user interface device 20, system tracking processing unit (STPU) 21, a container of gas 13, product container valve/tap 14, product distribution tubing 15, internet of things (IOT) gas pressure transducer monitoring devices 16 and 17, internet of things (IOT) Foam Detection Device 18, automatic internet of things (IOT) shut-off/switchover valve 19 (e.g., valve solenoid switchover) and an internet of things (IOT) non-invasive liquid drain detector (not shown).

The pressurized container of gas 13 and product container valve/tap 14 are utilized for gas mixture properties improving the quality of the product distributed. In a preferred embodiment, the pressurized container of gas 13 is nitrogen. Gas or distribution pressure/force 1 and pressurized gas container 13 can be of alternate gas, number of mixtures or form of drive pressure (e.g., CO2 or liquid $CO_2$). This gas drive/mixture is combined and distributed to the distribution source via gas/pressure distribution lines 2, and product distribution tubing 15 in order to drive the product to product distribution valve 10, while maintaining quality and integrity of the product.

The IOT Gas Pressure Transducer Monitoring devices 16 and 17 are utilized for gas mixture properties improving the quality of the product distributed. The range, accuracy and calibration of the IOT Gas Pressure Transducer Monitoring can be adapted, based upon the desired mix, historical tracking, form and accuracy, required by the product or original manufacturer's specifications. The IOT foam detection sensor 18 detects foam conditions in the liquid or gas distribution system. Foam detection can indicate system level problems (e.g., dirty lines 4) or keg empty status.

The (IOT) shut-off/switchover valve 19 switches an active beer line to a second liquid or gas distribution source when a first liquid or gas distribution source is empty. The IOT liquid drain detector can help to validate, calculate and correlate how much product was actually poured down the drain, versus other losses in the system. With the addition of the liquid drain detector and the foam detection sensor, the measurement system can ensure that an empty tap open condition is not falsely tabulated.

In operation, product (e.g., liquid or gas) flows through mixed product and gas distribution line 4 to product distribution valve 10 when one or more objects, such as, for example, a tap handle, changes orientation. The one or more orientation detectors determine the orientation of the one or more objects. The one or more sensors in the measurement system determine a three-dimensional (3D) space position of the orientation of the one or more objects. The measurement system determines if the three-dimensional (3D) space position of the one or more objects corresponds to a value within an event trigger range. The event trigger range may include, for example, one or more values corresponding to three-dimensional (3D) space position(s) for a tap handle "on" position.

If the three-dimensional (3D) space position corresponds to a value within the event trigger range, the measurement system triggers the timing unit to calculate temporal flow data, such as, for example, the time interval of the object's orientation from position "on" to position "off". The measurement system stores calibrated/calculated values corresponding to the three-dimensional (3D) space positions for "on", "Percent On" and "off" object positions. The measurement system triggers the timing unit to stop calculating the temporal data flow when the object's orientation returns to an "off" position.

In an alternative exemplary embodiment, the measurement system generates an event start trigger and an event stop trigger to control the timing unit to start calculating the time interval between the event start and event stop triggers. The event start trigger and event stop trigger may correspond to object orientation "on" position and object orientation "off" position respectively.

The temporal flow data calculated by the system tracking measurement unit (STMU) 8 is transmitted to the system tracking processing unit (STPU) for further processing. The STPU determines one or more tracking parameters, such as, for example, liquid, granular solid, or gas flow rate or liquid or gas volume using the temporal flow data and a set of evaluation rules. An accurate flow rate, such as, for example, for a liquid, can be determined utilizing the known product and gas drive pressure mix found in tube 4, the known or calculated orifice size 9, and the temporal flow data based on known fluid dynamics evaluation rules. The liquid volume may be derived from the liquid flow rate.

Using the temporal data flow, a known or calculated orifice size (fixed, variable or calculated) and known pressures/forces driving the liquid or gas, an accurate measurement of flow can be calculated that is not subject to many of the deficiencies found in most flow measurement systems, such as, for example, clogged flow sensors due to contaminants or low flow inertia to activate sensor. Alternately, natural gravity flow in the case of either granular solid or an alternate method of liquid measurement can be employed with accuracy, removing the applied pressure from the equation and only using gravity.

The measurement system determines the flow rate of the liquid or gas being distributed from a liquid or gas distribution source independent of the size of the liquid or gas distribution source or the liquid or gas receiving object. The system is not dependent on the distributed container size for calculations or even the amount of product in the original distribution container (e.g., infinite supply of product). The system will remain accurate in product distribution data and flow rate calculations.

The operation of the system tracking measurement unit (STMU) does not require an internal flow of the liquid or gas being distributed from the liquid or gas distribution source, as such, the STMU is not located in the flow of liquid or gas being distributed from the liquid or gas distribution source. The STMU can effectively measure temporal data flow dependent upon the determined three-dimensional (3D) space positioning of one or more objects.

Further, the measurement system is capable of determining one or more system conditions of a distribution system, such as, for example, the number of servings left before the distribution source (e.g., keg) is empty, status of distribution source (e.g., keg) percent full, and originally delivered distribution source (e.g., keg) volume once the distribution source (e.g., keg) is emptied, based on the one or more tracking parameters and a set of evaluation rules.

For example, if a distribution source is one (1) keg, and based on evaluation rules, one (1) keg holds 1984 ounces of beer and one (1) serving equals 16 ounces, then the total number of servings per keg can be determined (e.g., 124). The measurement system may tally the actual number of servings from the liquid or gas distribution system based on the tracking parameters. The number of servings left before the distribution source is empty can be determined from the total number of servings per keg and the actual number of servings (including the real-time accuracy of actual pour volume) distributed from the keg per unit of time.

Data corresponding to the one or more system conditions determined by the STPU are transmitted to user interface device 20 for real-time notification to a user of system conditions and for display and further data manipulation or visualization via by a processing system.

In addition, the measurement system may include one more detectors to detect tampering and other non-normal conditions. The detector may detect tampering with the STMU, for example, when the determined three-dimensional (3D) space position corresponding to a tap handle "on" position does not corresponds to a value within the event trigger range. The values within the event trigger range correspond to the stored calibrated/calculated values corresponding to an accurate three-dimensional (3D) space position for a tap handle "on" orientation.

Figure 3:
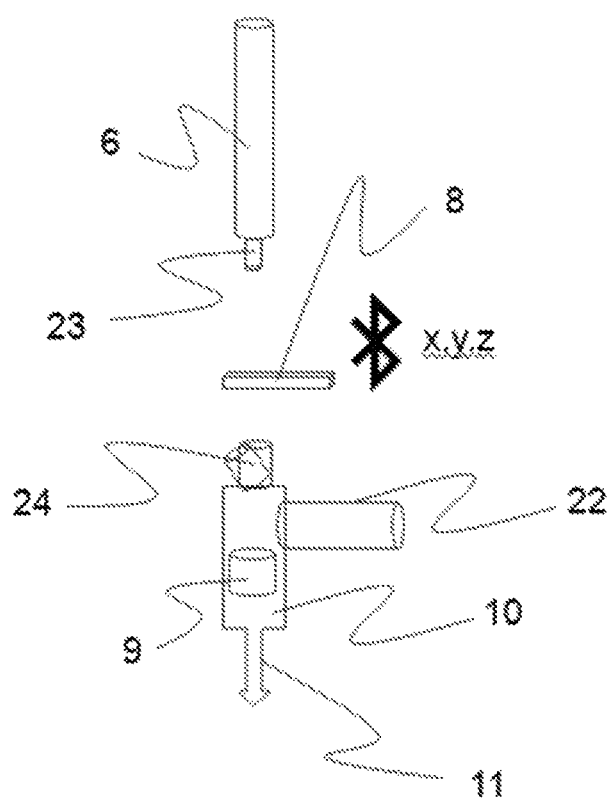
FIG. 3 shows an exemplary illustration of the system tracking measurement unit according to an embodiment of the present disclosure.

FIG. 3 shows an exemplary illustration of the system tracking measurement unit (STMU) 8, used in a tap handle assembly. The STMU is a timed event, 3D space position, known pressure and known orifice size based measurement system, adapted to fit without modification to a standard tap handle 6 and valve 24. The STMU 8 is independent of the liquid or gas distribution source 3.

The STMU 8 adapts to a standard or custom handle base 23. Standard in most conditions, but some manufacturers have oddly shaped handle or adaption point, which can easily be accommodated by the subject invention with minor adaptor kits. The product distribution valve assembly 10 typically connects to a distribution or manifold assembly 22.

In an exemplary embodiment, the system measurement tracking unit (STMU) is adapted to a common beer tap handle (e.g., a standard tap handle in a keg beer distribution system), which is typically full off, percent angle on or full on, recalibration of the full scale and interim angle range can be auto calibrated often/most of the time. Additionally, by adding common pour sizes to measurement system calculations, the system can operate without the need for calibration.

The STMU may be mounted and unmounted to/from the tap handle at any time. When the STMU is remounted to the tap handle, the STMU does not have to be mounted at the same location as the prior mounting for accurate operation. The STMU can be mounted/attached to the tap handle at a location independent of its last know position. Thus, orientation and auto calibrating of the major delta axis and fused three-dimensional (3D) (x,y,z) space position to determine the best resolution of tap handle angle can be efficiently determined.

In some exemplary embodiments, the STMU is adapted to operate with a liquid or gas distribution system with distribution lines, including a distribution system with long distances of distribution lines. Additionally, the STMU is adapted to remain fully operational when an inadvertent evacuation of liquid or gas within the distribution lines occurs.

In some exemplary embodiments, the STMU is adapted to operate with a Digital IOT (Internet of Things) Gas Pressure Transducer Monitoring, a Digital/Ultrasonic IOT (Internet of Things) Foam Detection Device Sensor, Digital IOT (Internet of Things) Valve Solenoid Switchover, and an IOT (Internet of Things) non-invasive Liquid Drain Detector.

In some exemplary embodiments, the STMU 8 operates either standalone or in combination with a computerized system tracking processing unit and monitoring application. The STMU can either be designed into new measurement installations or retrofitted to existing measurement or distribution systems, with minimal to no change in system plumbing. The STMU can be scalable from 1 to x number of distribution taps, depending on the size of an establishment.

In another exemplary embodiment, the STMU can also be scaled to a client's affordability, by starting with a minimal system consisting of just the packaged 3D position sensors, LED status, timer, known orifice, wireless communication, battery and software/firmware. Then scaled/upgraded to include: Digital IOT (Internet of Things) Gas Pressure Transducer Monitoring (high/low), a Digital/Ultrasonic IOT (Internet of Things) Foam Detection Device sensor, Digital IOT (Internet of Things) keg, 1 to x valve solenoid switchover, when detected empty, and an IOT/non-invasive Liquid Drain Detector that can help to validate, calculate and correlate how much product was actually poured down the drain, versus other losses in the system. The STMU can be upgraded in the field to a full closed loop system.

In a full closed loop system, having IOT Gas Pressure Transducer Monitoring, the measurement system is capable of recording, archiving and retrieving previously set conditions of optimal product distribution. For example, if a system component, pressure, gas mixture, or significant environmental variable has changed the barkeeper, manager, brew master or owner can go into the records to recover previous setting for a proper pour.

Moreover, in some exemplary embodiments, as noted above, the system tracking measurement unit (STMU) is not located in the flow of the liquid, gas or granular solid, being distributed from the liquid or gas distribution source, and therefore the STMU is not subject to disruption, corrosion, clogging or compatibility with the subject liquid/gas/granular solid being measured. In addition, the STMU is not subject to the change or reduction of flow, compatibility with the substance being distributed or measured and is not subject to the environmental corrosion or clogging found in similar other fluid measuring systems.

In some exemplary embodiments, the STMU includes a self-contained battery (e.g., a small button cell battery). The battery may be fixed or replaceable and can last between 6-24 months under normal use prior to needing battery/device change. The battery allows the STMU to continue to detect, collect and buffer a number of events (minimum of ten (10)), even if the system or establishments experience a power loss.

In an exemplary embodiment, the measurement system does not degrade over time or lose accuracy during low flow conditions, typically found and susceptible in most turbine, vane, laminar flow, ultrasonic, paddle wheel or pressure differential systems. Further, the measurement system will continue to detect, collect and buffer a number (minimum 10) of events, even if the system or establishments experience a power loss. Once power to the system is restored, the device will report the off-line events and no loss of system data integrity or history is lost.

In another exemplary embodiment, the measurement system requires minimal upkeep and calibration to maintain accuracy. If no other settings have changed such as, for example, physical tap characteristics, type of liquid, drive pressure, product temperature or $CO_2$/Nitrogen setting (or other gas driven sources), and then the system may only require initial calibration. Initial calibration is simply pouring (distributing) a known amount of product and reporting/inputting that to the software (time is automatically calculated). The calibration vessel can be as simple as a common measuring cup. From this, flow and accuracy will remain constant and only periodic (good measure) calibration will need to be performed.

This good measure calibration is more to detect and analyze the overall distribution system for changes or troubleshoot issues in the actual distribution lines, setup or things that have changed, without being reported (e.g. pressure or gas mixture). Additionally, even if good measure calibration is not performed, a standard pour size variable, input into the software application, will auto calibrate, based on analytics of use and alert the enterprise application of anomalies. These anomalies will assist the operators to troubleshoot other sub-systems of the distribution systems (e.g. clogged/kinked lines, pressure change, tap change, beer type change, etc.)

Further, in an exemplary embodiment, the measurement system remains fully functional and operation over long distances of distribution lines (not uncommon to have 50-250 feet of feed lines, when keg is remote to tap), thus minimizing product loss due to inadvertent evacuation of product within distribution lines (e.g. beer foam/unknown keg status).

In another exemplary embodiment, the measurement system constantly monitors temperature, foam, CO2 and Nitrogen gas mixtures in real time to provide a consistent and high quality pour of product each time. The measurement system accurately measures each pour for barkeeper managements and also monitors the enterprise tracking for overall inventory and system efficiencies.

The disclosed embodiments are not inclusive and many other modifications and variations will be apparent to someone of ordinary skill in the art with construction skills in the related arts. Together the descriptions and accompanying illustrations seek to provide an explanation of the basic principles of the embodiment and its application. It is therefore intended that the specification and embodiments be considered as exemplary only.

Some operations may be implemented, for example, using a machine or tangible computer-readable medium or article which may store an instruction or a set of instructions that, if executed by a machine, may cause the machine to perform operations in accordance with some aspects of some exemplary embodiments. Such a machine may include, for example, any suitable processing platform, computing platform, computing device, processing device, computing system, processing system, computer, processor, or the like, and may be implemented using any suitable combination of hardware and/or software.

The machine-readable medium or article may include, for example, any suitable type of memory unit, memory device, memory article, memory medium, storage device, storage article, storage medium and/or storage unit, for example, memory, removable or non-removable media, erasable or non-erasable media, writeable or rewriteable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), a tape, a cassette, or the like.

The machine readable medium may include any mechanism for storing, transmitting, or receiving information in a tangible form readable by a machine, and the medium may include a tangible medium through which the program code may pass, such as antennas, optical fibers, communications interfaces, etc. Program code may be transmitted in the form of packets, serial data, parallel data, etc., and may be used in a compressed or encrypted format.

Program code, or instructions, may be stored in, for example, volatile and/or non-volatile memory, such as storage devices and/or an associated machine readable or machine accessible medium including, but not limited to, solid-state memory, hard-drives, floppy-disks, optical storage, tapes, flash memory, memory sticks, digital video disks, digital versatile discs (DVDs), etc., as well as more exotic mediums such as machine-accessible biological state preserving storage.

The instructions may include any suitable type of code, such as source code, compiled code, interpreted code, executable code, static code, dynamic code, encrypted code, and the like, implemented using any suitable high-level, low-level, object-oriented, visual, compiled and/or interpreted programming language.

Unless specifically stated otherwise, it may be appreciated that terms such as "processing," "computing," "calculating," "determining," or the like, refer to the action and/or processes of a computer or computing system, or similar electronic computing device, that manipulates and/or transforms data represented as physical quantities (e.g., electronic) within the computing system's registers and/or memories into other data similarly represented as physical quantities within the computing system's memories, registers or other such information storage, transmission or display devices. The embodiments are not limited in this context.

The terms "first", "second", etc. may be used herein only to facilitate discussion, and carry no particular temporal or chronological significance unless otherwise indicated.

Those skilled in the art will appreciate from the foregoing description that the broad techniques of the embodiments of the present invention may be implemented in a variety of forms. Therefore, while the embodiments of this invention have been described in connection with particular examples thereof, the true scope of the embodiments of the invention should not be so limited since other modifications will become apparent to the skilled practitioner upon a study of the drawings, specification, and following claims.

What is claimed is:

1. A measurement system for providing real-time tracking, the system comprising: a system tracking measurement unit ("STMU") comprising:
   one or more sensors for determining a three-dimensional (3D) space positioning of one or more objects;
   one or more orientation detectors for detecting an orientation of one or more objects based on the determined three-dimensional (3D) space positioning of the one or more objects;
   a timing unit for calculating temporal flow data based on the detected orientation of the one or more objects;
   an electronic communications channel for transmitting the temporal flow data to system tracking processing unit;

a system tracking processing unit ("STPU") comprising:
a first electronic communications channel for receiving the temporal flow data from the STMU;
a microprocessor;
a memory storage area;
a database stored in the memory storage area for storing a first set of evaluation rules, wherein the first set of evaluation rules corresponds to one or more tracking parameters, and a second set of evaluation rules, wherein the second set of evaluation rules corresponds to one or more system conditions;
a tracking processing module, in the memory storage area, having program instructions that, when executed by the microprocessor, causes the microprocessor to:
i) determine one or more tracking parameters using the temporal flow data and the first set of evaluation rules, and
ii) determine one or more system conditions of a liquid or gas distribution source using the one or more tracking parameters and the second set of evaluation rules;
a second electronic communications channel for transmitting data corresponding to the one or more system conditions for display on user interface device; and
a user interface device for receiving the data corresponding to one or more system conditions over an electronic communications channel for real-time notification to a user of the one or more system conditions, the user interface device including a display.

2. The system of claim 1, wherein the timing unit commences the calculation of the temporal flow data when the detected orientation of the one or more objects corresponds to an event trigger value.

3. The system of claim 1, wherein the temporal flow data includes at least one of a time duration of one or more objects' on and off position orientation or a time duration of an event start/stop.

4. The system of claim 1, wherein the one or more tracking parameters includes one of i) liquid, granular bulk solid or gas flow rate or ii) liquid or gas volume.

5. The system of claim 4, wherein the liquid flow rate is determined based on the temporal flow data, a drive pressure force, and a known or calculated orifice size.

6. The system of claim 1, wherein the one or more tracking parameters are determined independent of a size of the liquid or gas distribution source or a liquid or gas receiving object.

7. The system of claim 1, wherein the STMU is not located in the flow of liquid or gas being distributed from the liquid or gas distribution source.

8. The system of claim 1, wherein the operation of the STMU is independent of any internal flow of the liquid or gas being distributed from the liquid or gas distribution source.

9. The system of claim 1, wherein the one or more system conditions is to include at least one or more from the group consisting of i) the number of servings left before the distribution source is empty, ii) status of the distribution source percent full, and iii) originally delivered distribution source volume once keg is emptied.

10. The system of claim 1, further comprising one or more detectors for detecting tampering and non-normal conditions.

11. The system of claim 1, further comprising a Digital IOT (Internet of Things) Gas Pressure Transducer Monitoring, a Digital/Ultrasonic IOT (Internet of Things) Foam Detection Device sensor, and Digital IOT (Internet of Things) Valve Solenoid Switchover.

12. The system of claim 1, further comprising an IOT (Internet of Things) non-invasive Liquid Drain Detector.

13. The system of claim 12, wherein a location of the attachment of the STMU to the tap handle is independent of its last know position.

14. The system of claim 1, wherein the STMU is adapted to attach to a standard tap handle in a liquid or gas distribution system.

15. The system of claim 1, wherein the STMU is adapted to mount to a standard beer tap handle in a keg beer distribution system.

16. The system of claim 1, wherein the one or more objects is to include a tap handle in a liquid or gas distribution system.

17. The system of claim 1, wherein the system is adapted to provide information to mobile phones, tablet computers, desktop computers, monitoring centers or a cloud network.

18. A system measurement tracking unit (STMU) comprising:
one or more sensors for determining a three-dimensional (3D) space position of one or more objects;
one or more orientation detectors for detecting an orientation of the one or more objects based on the three-dimensional (3D) space positioning of the one or more objects; a timing unit for determining temporal flow data based on the detected orientation
of the one or more objects, wherein the timing unit commences calculating the temporal flow data when the detected orientation of the one or more objects corresponds to an event trigger value; and
an electronic communications channel for transmitting the temporal flow data to a processing unit.

19. The system of claim 18, further comprising a status indicator, wherein the status indicator provides notification of poor status, distribution container status or system trouble.

20. The system of claim 18, further comprising a self-contained battery, wherein the battery allows the system to continue detecting, collecting and buffering a number of events during a power loss.

21. The system of claim 18, wherein the STMU is adapted to operate with a Digital IOT (Internet of Things) Gas Pressure Transducer Monitoring, a Digital/Ultrasonic IOT (Internet of Things) Foam Detection Device Sensor, and Digital IOT (Internet of Things) Valve Solenoid Switchover.

22. The system of claim 18, wherein the STMU is adapted to operate with an IOT (Internet of Things) non-invasive Liquid Drain Detector.

23. The system of claim 18, wherein the STMU is adapted to operate with a liquid or gas distribution system with distribution lines, including a distribution system with long distances of distribution lines.

24. The system of claim 23, wherein the STMU is adapted to remain fully operational when an inadvertent evacuation of liquid or gas within the distribution lines occurs.

25. The system of claim 18, wherein the temporal flow data includes at least one of a time duration of one or more objects' on and off position orientation or a time duration of an event start/stop.

* * * * *